US012736186B2

(12) United States Patent
Wessner et al.

(10) Patent No.: US 12,736,186 B2
(45) Date of Patent: Sep. 15, 2026

(54) FUEL GAS TANK AND FUEL GAS TANK SYSTEM

(71) Applicant: Robert Bosch GmbH, Stuttgart (DE)

(72) Inventors: Jochen Wessner, Esslingen (DE); Martin Katz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/867,556

(22) PCT Filed: May 11, 2023

(86) PCT No.: PCT/EP2023/062551
§ 371 (c)(1),
(2) Date: Nov. 20, 2024

(87) PCT Pub. No.: WO2023/237283
PCT Pub. Date: Dec. 14, 2023

(65) Prior Publication Data

US 2025/0347388 A1 Nov. 13, 2025

(30) Foreign Application Priority Data

Jun. 10, 2022 (DE) ..................... 10 2022 205 934.4

(51) Int. Cl.
*F17C 13/02* (2006.01)

(52) U.S. Cl.
CPC .... *F17C 13/026* (2013.01); *F17C 2205/0323* (2013.01); *F17C 2250/0439* (2013.01)

(58) Field of Classification Search
CPC ............ F17C 13/026; F17C 2205/0323; F17C 2250/0439; B60K 15/03006; B60K 2015/03013; B60K 2015/0319; B60K 2015/03026; B60K 2015/0321; B60K 2015/03315
See application file for complete search history.

(56) References Cited

U.S. PATENT DOCUMENTS

2010/0032934 A1 2/2010 Veenstra
2011/0180551 A1 7/2011 Handa

FOREIGN PATENT DOCUMENTS

DE 4131392 A * 8/1992
DE 102014003587 A1 9/2015
(Continued)

OTHER PUBLICATIONS

DE4131392A, Machine Translation (Year: 1991).*
(Continued)

*Primary Examiner* — Daphne M Barry
(74) *Attorney, Agent, or Firm* — Michael Best & Friedrich LLP

(57) ABSTRACT

The invention relates to a fuel gas tank (1) for a fuel gas tank system, said fuel gas tank comprising: a storage volume (3) which is enclosed by a wall (2) and can be filled with fuel gas via a tank line (4) having an integrated tank valve (5); and a temperature sensor (6) for sensing the temperature in the fuel gas tank (1), wherein the temperature sensor (6) is located outside the storage volume (3) and thermally connected to the storage volume (3) via a thermal conductor (7) projecting into the storage volume (3).
The invention also relates to a fuel gas tank system comprising at least one fuel gas tank (1) according to the invention.

11 Claims, 1 Drawing Sheet

(56) References Cited

FOREIGN PATENT DOCUMENTS

| | | | | | |
|---|---|---|---|---|---|
| DE | 102017011722 | A1 | | 6/2019 | |
| EP | 4537005 | B1 | * | 2/2026 | ............... G01K 1/16 |
| WO | WO-2021213501 | A1 | * | 10/2021 | ............. B60L 53/80 |

OTHER PUBLICATIONS

WO2021213501A1, Machine Translation (Year: 2021).*
EP-4537005-B1—Machine Translation (Year: 2026).*
Translation of International Search Report for Application No. PCT/EP2023/062551 dated Sep. 11, 2023 (2 pages).

* cited by examiner

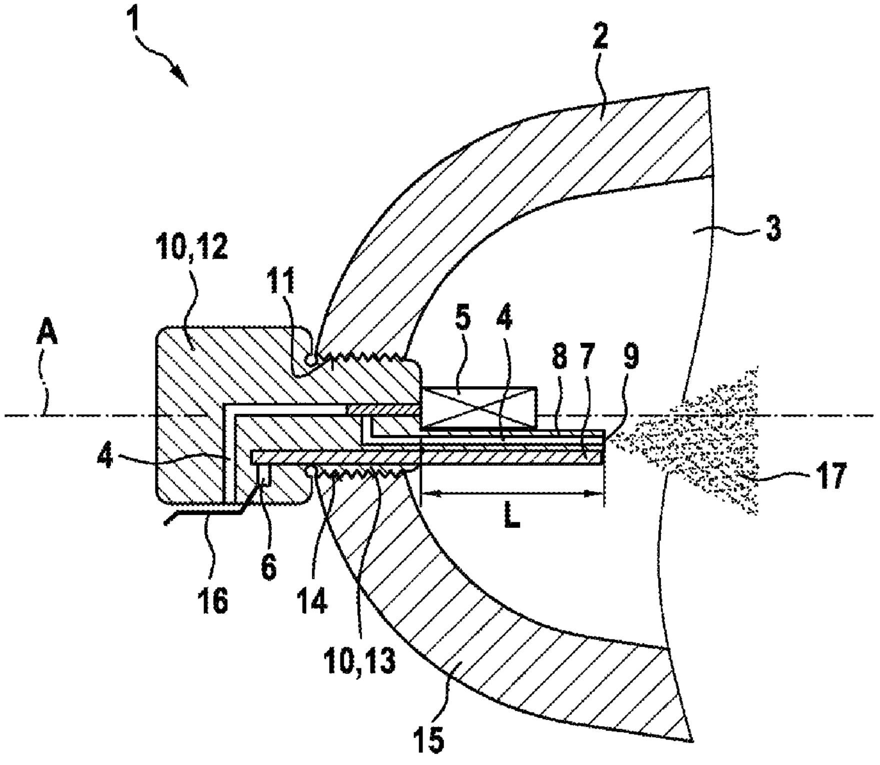
1
2
3
10,12
11
A
5
4
8
7
9
4
17
L
16
6
14
10,13
15

FUEL GAS TANK AND FUEL GAS TANK SYSTEM

BACKGROUND

The invention relates to a fuel gas tank for storing fuel gas, for example hydrogen or natural gas. Such fuel gas tanks are used in particular in vehicles that run on fuel gas, for example in a fuel cell vehicle or in a gas vehicle.

Furthermore, the invention relates to a fuel gas tank system with at least one fuel gas tank according to the invention.

In vehicles that are operated with a fuel gas, such as hydrogen, the fuel gas is usually stored under pressure in a fuel gas tank. With hydrogen, the pressure can be up to 70 MPa. The temperature in the fuel gas tank can rise to 85° C. The temperature limit is usually specified by the material of the fuel gas tank, wherein carbon fiber reinforced plastic ("CFRP") is often used as the material. If a CFRP material is used, the plastics required to fix the carbon fibers, in particular synthetic resins, become too soft above 85° C., so that the required strength of the fuel gas tank is no longer guaranteed.

Since hydrogen, for example, has a negative Joule-Thomson effect in the relevant temperature range, it heats up when refueling a fuel gas or hydrogen tank. To prevent damage to the fuel gas tank, hydrogen is therefore cooled to around −40° C. before refueling. Furthermore, a tank lance bent upwards can be used to fill the fuel gas tank, which promotes the mixing of fresh hydrogen with the tank contents and thus reduces heating. As a further measure, the tank temperature can be measured or monitored so that the refueling process can be aborted if the temperature limit is exceeded. To ensure that the temperature limit is safely maintained, demolition must be carried out in good time. High measurement tolerances therefore have a negative effect. Since the mass stored in the fuel gas tank is usually also determined based on the tank temperature, high measurement tolerances can also lead to an incorrectly calculated tank level or an incorrectly calculated remaining range.

For both purposes, it is therefore desirable to obtain the most accurate information possible about the temperature in a fuel gas tank. However, the locally occurring maximum temperature is decisive for compliance with the temperature limit, while the average temperature is more suitable for calculating the stored mass. It is difficult to reconcile these two wishes. This applies in particular because thermocouples, thermistors, or temperature resistors are usually used for temperature measurement, which can only sense the temperature in their immediate vicinity. Due to the limited accessibility of the tank interior, the choice of sensor position is also severely restricted.

US 2010/0032934 A1 provides an example of a fuel gas tank with a tank line and a tank valve for filling the fuel gas tank with fuel gas and a sensor located on the tank line for sensing a state variable of the fuel gas. The sensor is positioned in such a way that it is outside the forming pressure jet when the fuel gas tank is filled with fuel gas. This is intended to increase the measuring accuracy of the sensor.

SUMMARY

The present invention is concerned with the task of providing a fuel gas tank with a temperature sensor for sensing the temperature in the fuel gas tank, which has a high measuring accuracy and is easy to install.

To solve the problem, the fuel gas tank with the features of the disclosure is proposed. Furthermore, a fuel gas tank system with at least one fuel gas tank according to the invention is proposed.

A fuel gas tank for a fuel gas tank system is proposed, comprising a storage volume enclosed by a wall, which can be filled with fuel gas via a tank line with an integrated tank valve, and a temperature sensor for sensing the temperature in the fuel gas tank. The temperature sensor is located outside the storage volume and is thermally connected to the storage volume via a thermal conductor that projects into the storage volume.

The thermal conductor transmits temperature information from the inside of the fuel gas tank to the outside of the temperature sensor, so that the temperature of the fuel gas in the fuel gas tank can be sensed with the aid of the temperature sensor, even though the sensor is located outside the storage volume. At the same time, the arrangement of the temperature sensor outside the storage volume simplifies its installation and, if necessary, removal in the event of a defect, as the temperature sensor is more easily accessible. The necessary electrical connection of the temperature sensor is simplified in the same way.

As the temperature sensor in the proposed arrangement does not come into contact with the fuel gas, it is optimally protected. Furthermore, a gas-tight version of the temperature sensor can be omitted. A simple and inexpensive temperature sensor can therefore be installed.

Preferably, the section of the thermal conductor projecting into the storage volume has an axial length L, which is measured parallel to a longitudinal axis A of the fuel gas tank. The length L can be used to average the measured value, which corresponds to an average temperature in the fuel gas tank or at least comes very close to it.

The thermal conductor is also preferably aligned parallel to the longitudinal axis A. This means that the thermal conductor projects axially into the storage volume so that the temperature can be sensed down to the depth of the storage volume. The thermal conductor can, for example, be a rod made of a particularly thermally conductive material.

In a further development of the invention, it is proposed that the tank line ends in a pipe that projects into the storage volume and forms an outlet opening for the fuel gas. The fuel gas can be fed more centrally via the pipe, so that better mixing is achieved. The pipe is preferably designed like a tank lance for this purpose. A defined jet of combustion gas can also be formed via the outlet opening of the pipe. In particular, the pipe can run parallel to the thermal conductor. Furthermore, the pipe can be essentially the same length as the thermal conductor, so that the thermal conductor reaches approximately as far as the combustion gas jet. In this way, temperature information is also forwarded to the temperature sensor via the thermal conductor, making it possible to sense the maximum temperatures that occur locally when the fuel gas tank is filled with fuel gas.

Advantageously, the tank line, the tank valve, the temperature sensor, and the thermal conductor form a tank unit which is inserted into an opening located preferably centrally in the front of the wall of the fuel gas tank. The tank unit simplifies installation, as the tank line, tank valve, temperature sensor, and thermal conductor can be inserted into the opening in the wall as a pre-assembled unit. If the tank line is formed at least in sections by a pipe, this can also be part of the pre-assembled unit.

The tank unit is preferably inserted into the opening of the wall in such a way that the opening is closed gas-tight. Alternatively or additionally, at least one sealing element, for example a sealing ring, can be inserted between the tank unit and the wall of the fuel gas tank.

Preferably, the tank unit accommodates at least one further component, for example a further valve for removing fuel gas from the fuel gas tank. In particular, the additional valve can be an electromagnetically controllable valve that is designed as a normally closed valve in order to prevent fuel gas from escaping from the fuel gas tank in the event of a fault.

Furthermore, the tank unit preferably has a section projecting beyond the wall on the outside, in which the temperature sensor is integrated. The temperature sensor is therefore not only located outside the storage volume, but also outside the wall, so that the accessibility of the sensor is further optimized. Furthermore, the necessary electrical connection of the temperature sensor is simplified.

In addition, the tank unit preferably has a section with an external thread via which the tank unit is screwed into the opening in the wall. In this way, a positive fit is achieved between the tank unit and the wall of the fuel gas tank, which secures the position of the tank valve. The opening in the wall preferably has an internal thread corresponding to the external thread of the tank unit.

It is also proposed that the wall of the fuel gas tank is circular in cross-section. The circular cross-section increases the load capacity of the fuel gas tank so that high storage pressures are possible. The circular shape also promotes even pressure and temperature distribution in the fuel gas tank.

Alternatively or additionally, it is proposed that the wall of the fuel gas tank is spherically shaped in at least one end section. The spherical shape of the at least one end section further increases the pressure resistance of the fuel gas tank.

Furthermore, a fuel gas tank system is proposed which comprises at least one fuel gas tank according to the invention. For example, several similar fuel gas tanks can be held in a parallel arrangement via a common frame. The frame facilitates the installation of the fuel gas tank system in a vehicle, for example in a fuel cell vehicle.

A preferred embodiment of the invention is explained in more detail below with reference to the attached drawing. This shows a schematic longitudinal section through a fuel gas tank according to the invention in the area of a tank unit with integrated temperature sensor.

BRIEF DESCRIPTION OF THE DRAWING

FIG. 1. is a partial section view of a fuel gas tank of the invention.

DETAILED DESCRIPTION

The fuel gas tank 1 shown has a wall 2 with a circular cross-section, which encloses a storage volume 3 for a fuel gas. The end section 15 of the wall 2 shown is spherically shaped and has a central opening 11 into which a tank unit 10 is inserted or screwed. The tank unit 10 has a tank line 4 in which a tank valve 5 is integrated, which enables the fuel gas tank 1 to be filled with fuel gas via the tank line 4 and at the same time prevents fuel gas from escaping from the fuel gas tank 1. The tank line 4 runs over a pipe 8 that projects into the storage volume 3 and forms an outlet opening 9 for the fuel gas at its end. A defined jet of fuel gas 17 can be formed via the outlet opening 9.

The tank unit 10 inserted into the opening 11 also has a temperature sensor 6, which is integrated in a section 12 of the tank unit 10, which protrudes on the outside over the wall 2 of the fuel gas tank 1, so that the temperature sensor 6 is easily accessible. Furthermore, the necessary electrical connection can be made easily via a connecting wire 16.

The temperature sensor 6 integrated in the section 12 of the tank unit 10 is therefore located outside the storage volume 3 of the fuel gas tank 1 and thus optimally protected from the fuel gas. In order to sense the temperature in the fuel gas tank 1, the temperature sensor 6 is thermally connected to the storage volume 3 via a thermal conductor 7, which projects over a length L into the storage volume 3 of the fuel gas tank 1. The axial length L is measured parallel to a longitudinal axis A of the fuel gas tank 1.

The length L of the thermal conductor 7 is selected in such a way that an average value is formed from different temperature information and forwarded to the temperature sensor 6. The thermal conductor 7 is made of a particularly thermally conductive material for this purpose. The temperature information forwarded to the temperature sensor 6 corresponds to the average temperature in the fuel gas tank 1 or at least comes very close to it.

As shown in the figure as an example, the tank unit 10 can have a section 13 with an external thread 14, via which the tank unit 10 is screwed into the opening 11 of the wall 2. In this way, a positive fit is achieved between the tank unit 10 and the wall 2, which serves to secure the position of the tank unit 10.

The invention claimed is:

1. A fuel gas tank (1) for a fuel gas tank system, having a storage volume (3) which is enclosed by a wall (2) and can be filled with fuel gas via a tank line (4) with an integrated tank valve (5), and having a temperature sensor (6) for sensing the temperature in the fuel gas tank (1), wherein the temperature sensor (6) is located outside the storage volume (3) and is thermally connected to the storage volume (3) via a thermal conductor (7) projecting into the storage volume (3).

2. The fuel gas tank (1) according to claim 1, wherein a section of the thermal conductor (7) projecting into the storage volume (3) has an axial length (L) which is measured parallel to a longitudinal axis (A) of the fuel gas tank (1).

3. The fuel gas tank (1) according to claim 1, wherein the tank line (4) ends in a pipe (8) which projects into the storage volume (3) and forms an outlet opening (9) for the fuel gas.

4. The fuel gas tank (1) according to claim 1, wherein the tank line (4), the tank valve (5), the temperature sensor (6), and the thermal conductor (7) form a tank unit (10) which is inserted into an opening (11) in the wall (2).

5. The fuel gas tank (1) according to claim 4, wherein the tank unit (10) has a section (12) projecting on an outside beyond the wall (2), wherein the temperature sensor (6) is integrated into the section (12).

6. The fuel gas tank (1) according to claim 4, wherein the tank unit (10) has a section (13) with an external thread (14), via which the tank unit (10) is screwed into the opening (11) of the wall (2).

7. The fuel gas tank (1) according to claim 1, wherein the wall (2) is circular in cross-section and/or spherically shaped in at least one end section (15).

8. A fuel gas tank system, comprising at least one fuel gas tank (1) according to claim 1.

9. The fuel gas tank (1) according to claim 2, wherein the thermal conductor (7) is aligned parallel to the longitudinal axis (A).

10. The fuel gas tank (1) according to claim 3, wherein the pipe (8) runs parallel to the thermal conductor (7).

11. The fuel gas tank (1) according to claim 4, wherein the opening (11) is located centrally in a front of the wall.

* * * * *